(12) United States Patent
Singer et al.

(10) Patent No.: US 6,946,217 B2
(45) Date of Patent: Sep. 20, 2005

(54) BATTERY LOCK

(75) Inventors: Karl Singer, Barrington Hills, IL (US); Chad Seedorf, Lakewood, IL (US)

(73) Assignee: D & K Group, Inc., Elk Grove Village, IL (US)

( * ) Notice: Subject to any disclaimer, the term of this patent is extended or adjusted under 35 U.S.C. 154(b) by 30 days.

(21) Appl. No.: 10/729,819

(22) Filed: Dec. 5, 2003

(65) Prior Publication Data

US 2005/0123826 A1 Jun. 9, 2005

(51) Int. Cl.[7] .......................... H01M 2/30; E05B 65/00
(52) U.S. Cl. ..................... 429/65; 429/178; 429/179; 70/58
(58) Field of Search ............... 429/65, 97, 178, 429/179; 174/138 F; 70/58, 232, 166–169

(56) References Cited

U.S. PATENT DOCUMENTS

| | | | |
|---|---|---|---|
| 1,558,491 A | * | 10/1925 | Morfoot ............... 429/121 |
| 1,583,609 A | * | 5/1926 | Sayers ..................... 429/97 |
| 3,535,899 A | * | 10/1970 | Lastinger et al. ........ 200/43.11 |
| 3,752,173 A | | 8/1973 | Karpal |
| 4,337,301 A | | 6/1982 | Rorer et al. |
| 4,419,815 A | | 12/1983 | Rorer et al. |
| 5,376,477 A | | 12/1994 | Aidman et al. |
| 6,498,457 B1 | | 12/2002 | Tsuboi |
| 2002/0044768 A1 | | 4/2002 | Noda et al. |
| 2002/0086647 A1 | | 7/2002 | Ilvonen |

* cited by examiner

*Primary Examiner*—Jonathan Crepeau
(74) *Attorney, Agent, or Firm*—Wallenstein Wagner & Rockey, Ltd.

(57) ABSTRACT

A battery lock (10) includes a block (20), a locking mechanism (40) and a key assembly (70). Rotating the proper key will rotate the key mechanism (40) and a sleeve (50) disposed around a shaft (41), permitting the block (20) to pass by a pair of protuberances (150,151) within a cavity (144) to remove the lock (10) from a receptacle (141) or to lock the locking mechanism (40) behind the protuberances (150,151). In this manner, one can insert the battery lock (10) into the battery's (100) receptacle (141), secure the lock (10) in place and remove it.

31 Claims, 4 Drawing Sheets

BATTERY LOCK

TECHNICAL FIELD

The present invention generally relates to locking mechanisms, and more particularly, to a lock used for batteries used in aircrafts.

BACKGROUND OF THE INVENTION

The batteries for aircrafts, even light planes, can be quite large and heavy, weighing upwards of 100 lbs. apiece. One such lead-acid aircraft battery is disclosed in U.S. Pat. Nos. 4,337,301 and 4,419,815. This battery has an external receptacle and two externally projecting terminal posts therein. External electrical connections to the terminal posts are normally made by a socket containing female channels and electrical contacts therein for cooperating with the terminal posts. The socket is secured within the receptacle and electrical contact is made with the posts. The socket is connected to an electrical umbilical line so that electricity can flow between the battery and the aircraft through the electrical umbilical line.

Recent United States FAA regulations require owners or pilots to disconnect their batteries when departing from their planes. This requires the individual to open the battery compartment of the craft and physically remove the socket and electrical umbilical line from the battery. The purpose of this is to hamper theft of unguarded aircraft. Anyone trying to steal a plane must first reattach the socket and electrical umbilical line to the battery. This can be difficult, or at least time consuming, if the plane compartment within the aircraft is also locked.

These just noted regulations only hamper theft; they do not prevent theft. As a result, there is a significant need for a device to prevent theft of aircraft.

SUMMARY OF THE INVENTION

The present invention basically locks the aircraft's battery. It prevents someone without an appropriate key from attaching the electrical umbilical line to the battery. The battery lock of the present invention works with batteries having a receptacle with an inner side wall and a back wall for receiving a connector (e.g., socket) for connecting the battery to the aircraft. The battery's receptacle includes a pair of terminals projecting outwardly from the back wall of the receptacle and the receptacle has at least one transverse protuberance projecting outwardly from an inner side wall of the receptacle.

According to a first aspect of the present invention, the lock includes a block with an exterior side surface generally conforming to a portion of the inner side wall of the receptacle. This permits the block to be seated within the receptacle. It further prevents external access to one or more of the battery's terminals. A locking mechanism cooperates with the block and is rotatable between at least a first position and a second position. In the first position the locking mechanism can pass by the protuberance, permitting the block to be seated in and removed from the receptacle. In the second position the locking mechanism is prevented from passing by the protuberance, prohibiting the block from being removed from the receptacle. A key assembly communicates with the locking mechanism to rotate the locking mechanism between the just described first and second positions when a mating key is inserted into the assembly.

According to further aspects of the present invention, the inner side wall of the receptacle is generally goggle shaped and the exterior side surface of the block is contoured similarly. In addition, the block has channels therein for receiving the electrical terminals. The block is either composed of an insulated material or electrically conductive materials, such as metal, and insulative sleeves are placed within the channels for preventing the block from contacting the terminals.

The block further has a passageway therein for receiving portions of the key assembly and the locking mechanism. The key assembly is connected to the locking mechanism such that movement of the key assembly similarly moves the locking mechanism. Moreover, the locking mechanism has at least one slot therein adapted to accommodate the protuberance and allow the locking mechanism to pass by the protuberance and to prevent the locking mechanism to pass by the protuberance. In short, one or more slots associated with the locking mechanism permit bayonet mounting, locking, and bayonet unmounting of the lock within the receptacle.

Other advantages and aspects of the present invention will become apparent upon reading the following description of the drawings and the detailed description of the invention.

BRIEF DESCRIPTION OF THE DRAWINGS

In the accompanying drawings forming part of the specification, and in which like numerals are employed to designate like parts throughout the same.

DETAILED DESCRIPTION OF THE INVENTION

Figure 1:
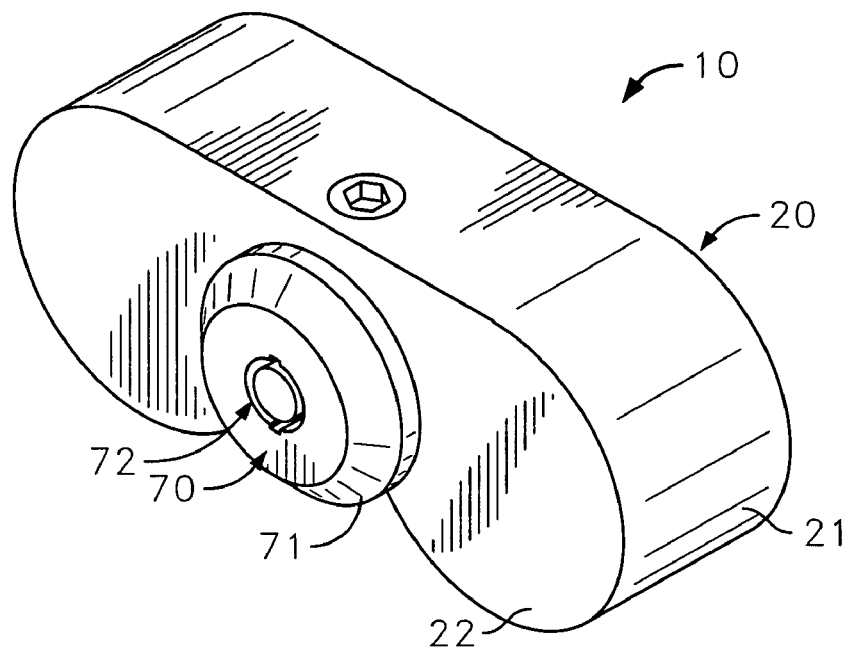
FIG. 1 is front perspective view of the battery lock of the present invention.

While this invention is susceptible of embodiments in many different forms, there is shown in the drawings and will herein be described in detail, preferred embodiments of the invention with the understanding the present disclosure is to be considered as an exemplification of the principles of the invention and is not intended to limit the broad aspect of the invention to the embodiments illustrated.

The Battery 100

Figure 2:
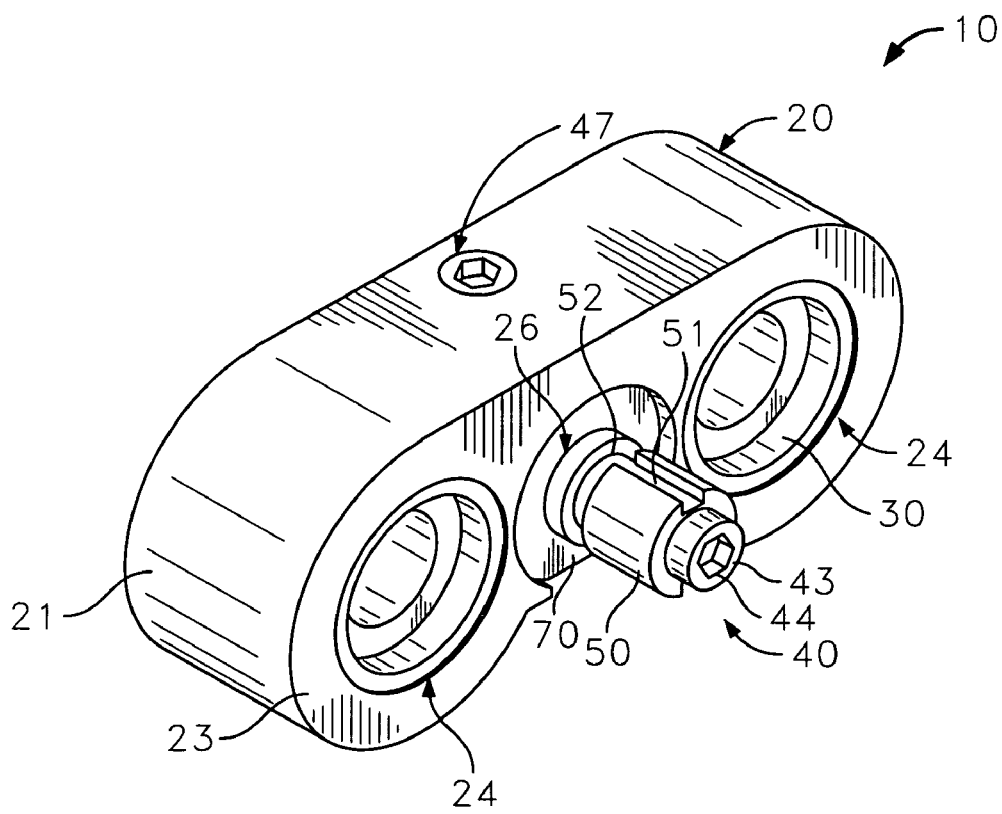
FIG. 2 is a rear perspective view of the battery lock of FIG. 1.
Figure 3:
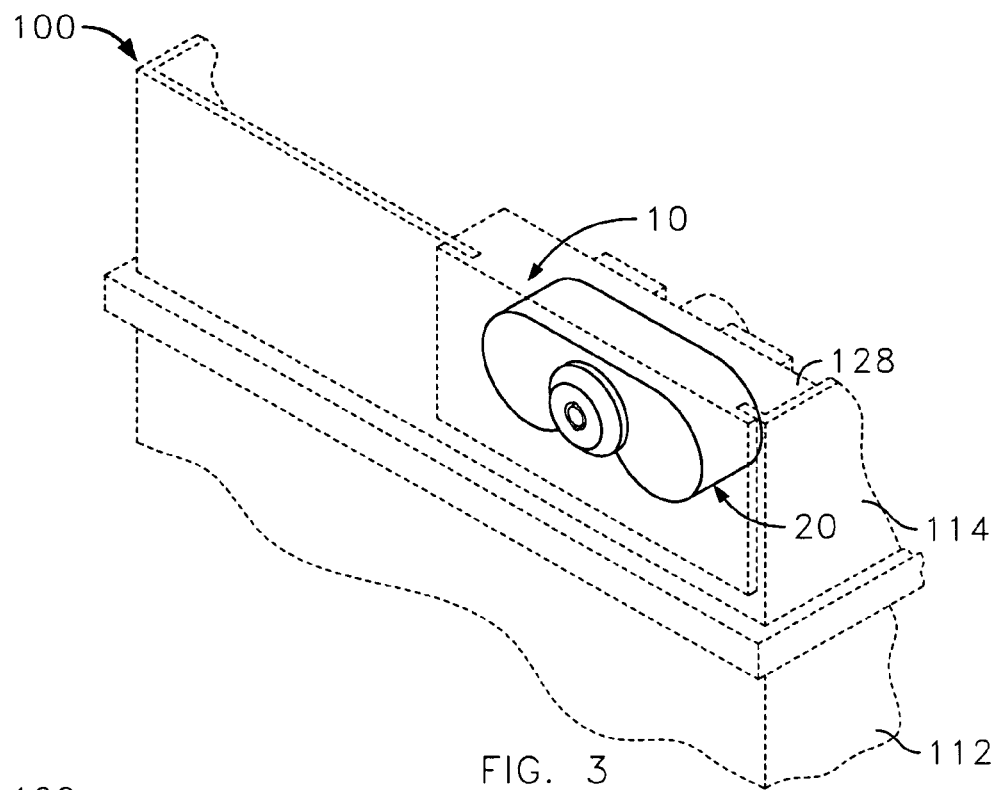
FIG. 3 is a front perspective view of the battery lock inserted into the battery, the battery being shown in phantom lines.

The battery lock of the present invention is generally designated by reference number 10. As shown in FIGS. 1 and 2, the lock 10 includes three principle components, a block 20, a locking mechanism 40 and a key assembly 70. The lock 10 shown in the present embodiment is designed to mate with an airplane battery, generally designated by reference number 100 (FIGS. 3–6).

The airplane battery 100 shown in the figures is typical of batteries used in small aircraft and is a lead-acid type of battery. For example, this type of battery is disclosed in U.S. Pat. No. 4,337,301, titled "Aircraft Battery" and U.S. Pat. No. 4,419,815, titled "Method of Making an Aircraft Battery," both disclosures being incorporated herein by reference. Both of these patents show Teledyne Industries, Inc. as the owner. Commercial batteries encompassing the disclosures in these patents are sold by Gill, a company related to Teledyne Industries.

The battery 100 generally includes a molded casing 112 with a number of separate cavities in which are placed the lead plates and the electrolyte material (not shown). A cover 114 is supported on and attached to the casing 112 and has a plurality of vent plugs (not shown) therein. Of particular interest to the present invention is that the cover 114 of the battery 100 has an aperture running within the side wall 134 for mating with the perimeter 132 of an insert 128. The insert 128 has a face plate 140 with a centrally located receptacle 141 projecting inwardly (towards the inside of the battery 100) therefrom. The receptacle 141 also has an inner side wall 142, a back wall 143 and a centrally located cavity 144. A pair of spaced apart openings 146 in the back wall 143 of the receptacle 141 permit the threading therethrough of terminals 126. The cavity 144 is positioned between the terminals 126, which extend outwardly from the receptacle's back wall 143. The construction and use of terminals, or posts, such as those shown is well known to those skilled in the art. One post is a positive (+) lead and the other post is a negative (−) lead.

The insert 128 and its receptacle 141 are added to the battery 100 specifically for receiving a connector, socket or umbilical (not shown) connected to the aircraft's electrical system. The socket, acting in a manner similar to an electrical plug, is configured to fit within the receptacle 141, over the two projecting terminals 126, and into the central cavity 144. Once the connector is inserted into and mated with the receptacle 141, the aircraft is connected to the battery 100. At the end of a flight, or during maintenance, the battery 100 can be disconnected by removing the connector from the receptacle 141 and terminals 126.

Figure 4:
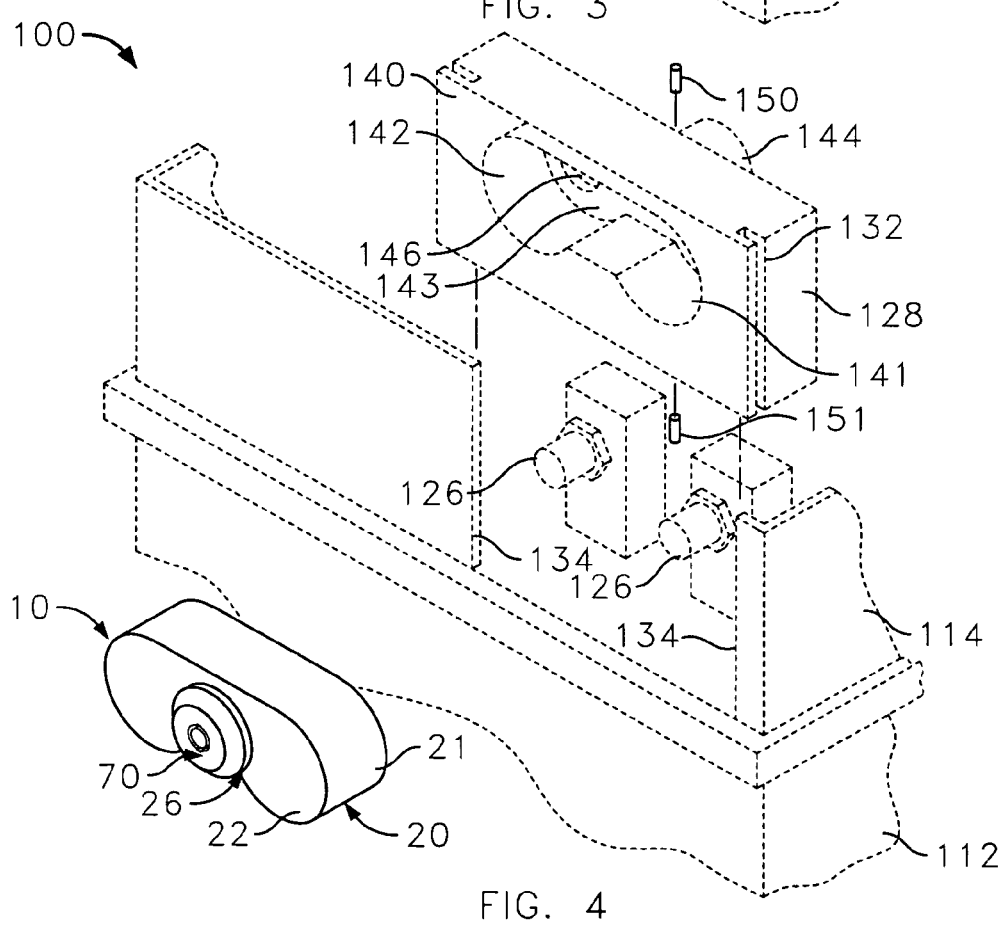
FIG. 4 is a further front perspective view of the battery lock separated from the battery, the battery being shown in phantom lines and with a component part being separated.
Figure 5:
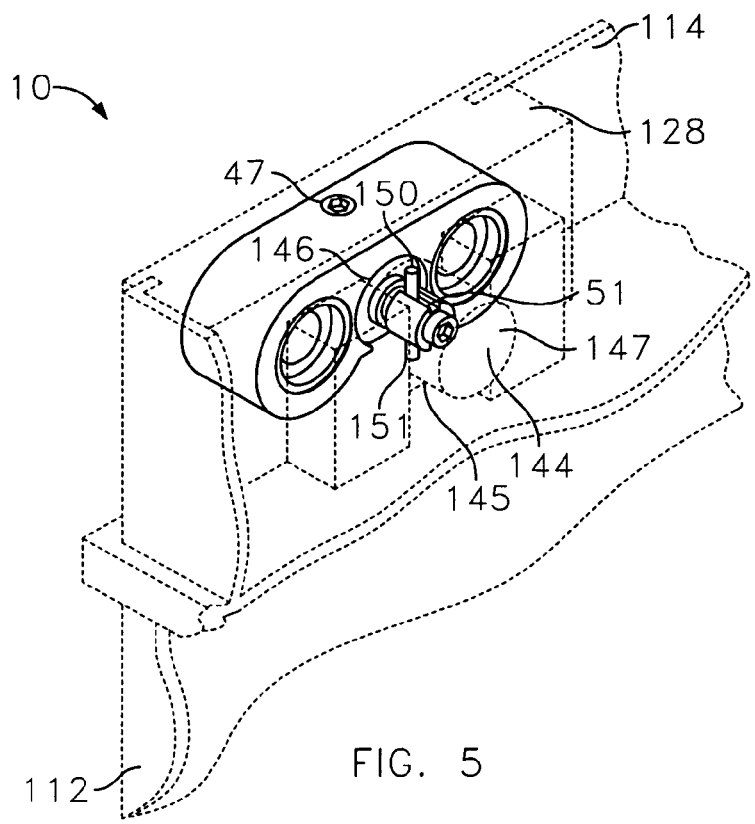
FIG. 5 is a rear perspective view of the battery lock inserted into the battery with the lock being in the unlocked position.
Figure 6:
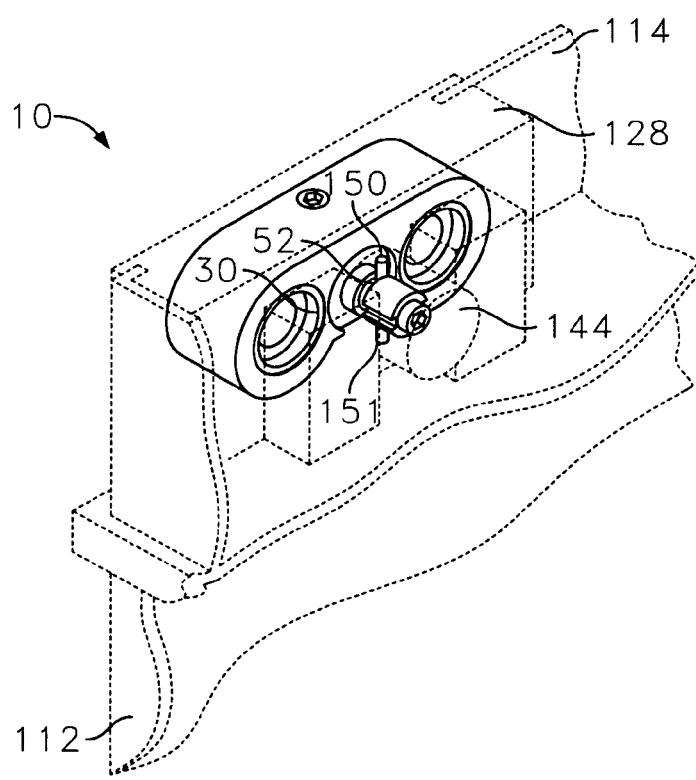
FIG. 6 is a rear perspective view of the battery lock inserted into the battery with the lock being in the locked position.
Figure 8:
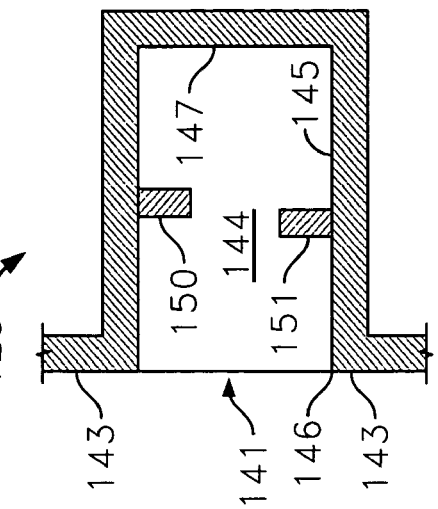
FIG. 8 is a schematic sectional view of the cavity of the insert and receptacle.

The cavity 144 within the receptacle 141 supports two opposed protuberances 150,151. One protuberance 150 extends transversely, or downwardly from a top or upper wall (the upper portion of the side wall 145) of the cavity 144 into the cavity and towards the center of the cavity and the other protuberance 151 extends transversely, or upwardly from a bottom or lower wall (the lower portion of the side wall 145) of the cavity into the cavity and towards the center of the cavity. The protuberances 150,151 can be molded into the cavity 144 during construction or inserted after molding the insert 128. These protuberances are shown in solid lines and schematically in FIGS. 4–6 and 8. In FIG. 4, the protuberances 150,151 are shown in exploded format so that their orientation may be clearly shown. In FIGS. 5 and 6, the protuberances 150,151 are shown projecting into the cavity (shown in phantom lines). As shown schematically and in section in FIG. 8, the protuberances 150,151 transverse the cavity 141 between the junction 146 of the receptacle 141 and the cavity 144 and the back wall of the cavity 147. The protuberances' 150,151 positioning blocks or prevents anything from passing thereby unless configured appropriately, as will be discussed in more detail below. In short, the protuberances act as gatekeepers or abutments to anything passing from the receptacle 141 to the cavity's back wall 147 or visa versa, as gatekeepers or abutments to anything passing from the cavity's back wall to the receptacle.

The Lock 10

As noted previously, the lock 10 of the present invention includes three principle components, that being the block 20, the locking mechanism 40 and the key assembly 70. Each will be discussed in turn below. Generally, the lock 10 mates with the insert 128, along with the receptacle 141, terminals 128 and cavity 144, of the battery 100 when the battery is disconnected from the electrical connector/socket for the aircraft. When the lock 10 is locked in place to the battery 100, the lock "locks-out" the battery and prevents the battery from being used as an energy source for the aircraft. The battery thus being locked prevents it from being used until the lock is both unlocked and removed from the battery.

The Block 20

The block 20 fits within the receptacle 141 of the insert 128 of the battery 100 and covers the terminals 128. The block 20 has an exterior side surface 21 generally conforming to the inner side wall 142 of the receptacle 141 for seating within the receptacle and preventing external access (by anything else) to one or more of the terminals 128. As seen in the figures, the particular battery shown 100 has an inner side wall 142 of the receptacle 141 generally goggle shaped. As such, the exterior side surface 21 of the block 20 is contoured similarly, that being goggle shaped. This also prevents one from installing the lock in the wrong orientation. Of course, it is recognized that other sizes and contours may be used without departing from the spirit of the present invention.

The block 20 further has two channels 24 in its rear surface 23 for receiving the pair of terminals 128. Thus, when the lock 10 is seated within the receptacle 141, the block 20 covers the terminals 128, the terminals being seated in the rear channels 24. In order to avoid or prevent electrical shorts, the block 20 is composed of a hard and strong insulated material. In the alternative, the block 20 may be constructed of a strong metal or carbon material with insulated sleeves 30 (cup shaped) disposed within the channels 24 for preventing the electrically conductive block from contacting the electrical terminals 128. Other techniques for insulating the channels' walls 24 and preventing an electrical short between the terminals can be employed and are well known in the art. For example, without limitation, one can coat the walls (side and back walls) of the channels 24 with a durable insulated material.

The block 20 further has an internally threaded passageway 26 extending from its front face 22 through to its rear surface 23 for receiving portions of the key assembly 70 and the locking mechanism 40.

The Locking Mechanism 40

The locking mechanism 40 cooperates with the block 20 and is movable (specifically rotatable) between a first position (FIG. 5) and a second position (FIG. 6). In the first position, the locking mechanism is capable of passing by the protuberances 150,151 of the cavity 144 permitting the block 20 to be seated in and removed from the receptacle 141. In the second position, the locking mechanism is prevented from passing by the protuberances 150,151 extending into the cavity 144, prohibiting the block 20 from being removed from the receptacle 141 or completely inserted into the receptacle.

Figure 7:
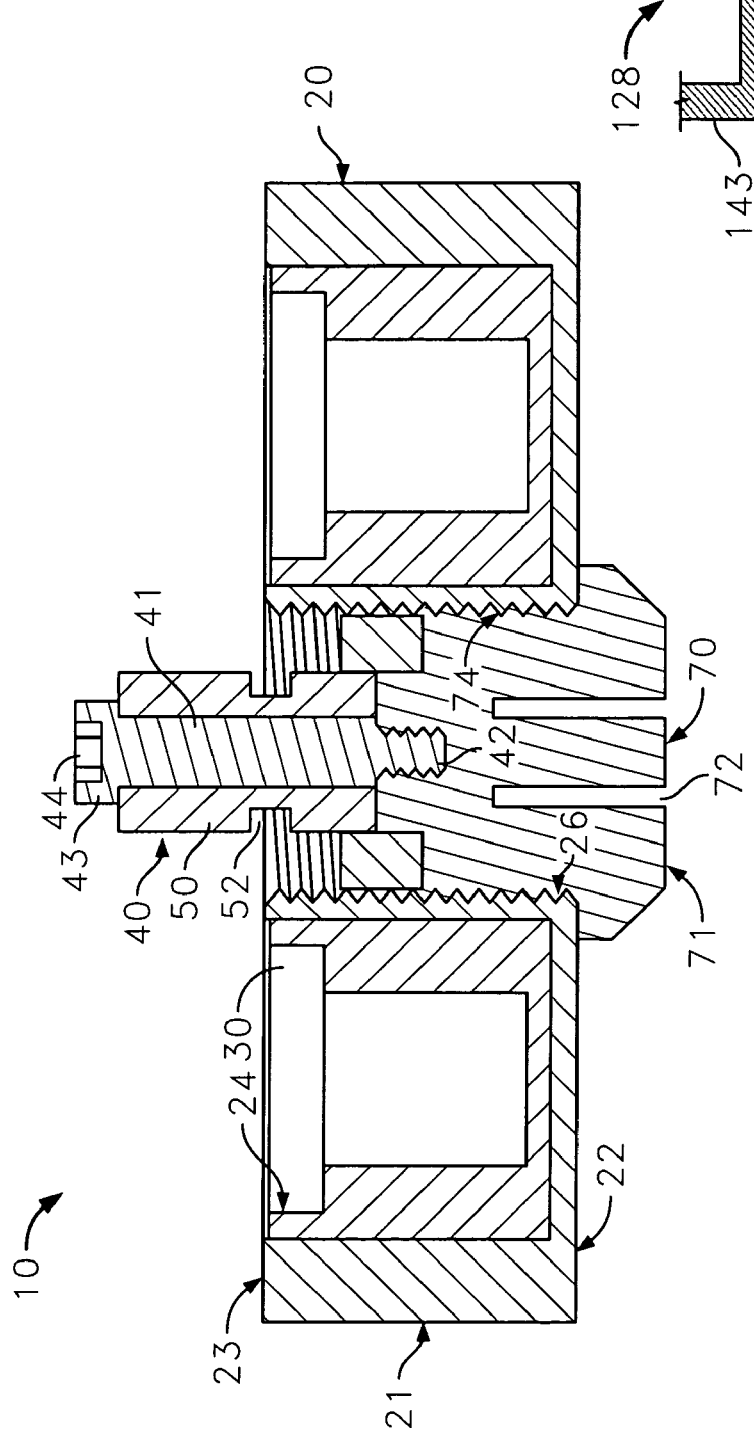
FIG. 7 is a sectional view of the battery lock.

Turning in particular to FIGS. 2 and 7, the locking mechanism 40 has a central shaft 41 with a threaded stud 42 at one end and a head 43 at the distal end. A cylindrical sleeve 50 is disposed around the shaft 41 and firmly secured between the stud 42 and the head 43. The head 43 has a female receptacle 44 for receiving a mate, such as a hex wrench/key, torx wrench/key, standard key or screwdriver. By inserting into and using a tool for the female receptacle 44, the stud 42 is driven into and secured to the key assembly 70 thereby also securing the sleeve 50 to the key assembly 70. Thus, when the key assembly 70 is rotated, the locking mechanism 40 (including the shaft 41 and sleeve 50) is rotated as well.

It should be noted that while the shaft 41 and head 43 are shown as a single piece, the head may be a nut, bolt or end cap secured to the shaft.

The sleeve 50 is constructed with two longitudinal slots or grooves 51 and at least one annular slot or groove 52 in communication with the longitudinal slots/grooves. The grooves 51,52 are constructed into the sleeve 50 or cut into the outer surface of the sleeve. These slots 51,52 permit both the bayonet mounting and the locking of the sleeve 50 around the protuberances 150,151. Specifically, as shown in FIG. 5, with the lock in the unlocked position, the longitudinal channels 51 are aligned with the protuberances 150, 151 extending into the cavity 144. The longitudinal slots 51 permit the locking mechanism, and in particular the sleeve 50 about the shaft 41, to pass between the protuberances 150,151. The protuberances ride within the longitudinal slots 51. When the locking mechanism is first properly in the cavity 144, the protuberances 150,151 are seated at the junction of the longitudinal slots 51 and the annular slot 52. As a result, when the key assembly 70 and locking mechanism 40 are rotated into the locked position, FIG. 6, the annular slot 52 permits the locking mechanism, and in particular the sleeve 50 about the shaft 41, to rotate. The protuberances 150,151 thus ride within the annular slot 52. Rotating the key assembly 70, shaft 41 and sleeve 50, results in the longitudinal slots 51 falling out of alignment with the protuberances 150, 151 extending into the cavity 144. If the key (not shown) is removed, and the key assembly 70 prevented from rotating, the protuberances 150,151 will not be able to rotate. Consequently, the slot 51,52 configuration will, in essence, lock the protuberances 150,151 within the annular slot 52 and prevent removal of the lock mechanism 40 from the cavity 144 and also the lock 10 from the receptacle 141.

The Key Assembly 70

As noted, the key assembly 70 is in communication with the locking mechanism 40. The key assembly 70 includes a key face 71 and a primary, central key hole 72. The details of key lock mechanisms and how to secure such mechanisms into a surrounding structure (e.g., the block 20) are well known in the art and are quite conventional. Generally, the key assembly 70 is screwed (outer threads 74) into the block 20 so that the back of the key face 71 abuts the front surface 22 of the block. A keyed stud 47 (FIG. 5) passing transversely through a transverse passageway within the block 20 locks the entire key assembly 70 into the block so that key assembly 70 cannot be removed when the lock is in the receptacle 141. The key hole 72 is customized to receive a mating key (not shown), such as a hex wrench/key, torx wrench/key, standard key or screwdriver (phillips or flat head).

With the mating key inserted into the primary key hole 72, rotating the key will permit the internal components of the key assembly 70 to rotate the locking mechanism 40. As a result, rotating the proper key will rotate the key mechanism 40 and the sleeve 50 permitting the block 20 to pass by the protuberances and thereby remove the lock 10 from the receptacle 141 or secure the locking mechanism 40 behind the protuberances 150,151. In this manner, one can insert the battery lock 10 into the receptacle 141, lock the mechanism 10 in place and remove it.

While the specific embodiments have been illustrated and described, numerous modifications come to mind without significantly departing from the spirit of the invention and the scope of protection is only limited by the scope of the accompanying claims.

We Claim:

1. A battery lock for a battery having a receptacle with an inner side wall and a back wall for receiving a connector for connecting the battery to an outside component, the receptacle including at least a pair of terminals projecting outwardly from the back wall of the receptacle, the receptacle having at least one transverse protuberance projecting outwardly from an inner side wall of the receptacle, comprising:

a block having an exterior side surface generally conforming to a portion of the inner side wall of the receptacle for seating within the receptacle and preventing external access to one or more of the terminals;

a locking mechanism cooperating with the block and movable between at least a first position and a second position, in the first position the locking mechanism passing by the protuberance permitting the block to be seated in and removed from the receptacle, and in the second position the locking mechanism being prevented from passing by the protuberance prohibiting the block from being removed from the receptacle; and, a key assembly communicating with the locking mechanism to move the locking mechanism between at least the first and the second positions when a mating key is inserted into the assembly.

2. The battery lock of claim 1 wherein the inner side wall of the receptacle is generally goggle shaped and the exterior side surface of the block is contoured similarly.

3. The battery lock of claim 1 wherein the block has channels therein for receiving the pair of terminals.

4. The battery lock of claim 1 wherein the block is composed of an insulated material or is metal with insulated sleeves within the channels for preventing the block from contacting the terminals.

5. The battery lock of claim 1 wherein the block has a passageway therein for receiving portions of the key assembly and the locking mechanism.

6. The battery lock of claim 5 wherein the key assembly is connected to the locking mechanism such that movement of the key assembly similarly moves the locking mechanism.

7. The battery lock of claim 1 wherein the locking mechanism has at least one slot therein adapted to accommodate the protuberance as the locking mechanism to pass by the protuberance and to prevent the locking mechanism to pass by the protuberance.

8. The battery lock of claim 7 wherein the slot in the locking mechanism has two sections, a first longitudinal section and a second transverse section.

9. The battery lock of claim 8 wherein each section of the slot in the locking mechanism comprises a separate slot, the second transverse section being an annular slot.

10. The battery lock of claim 1 wherein the locking mechanism includes a slot therein to permit bayonet mounting, locking and bayonet unmounting of the block within the receptacle.

11. The battery lock of claim 1 wherein the locking mechanism is cylindrical and has a through adapted to hold an extension projecting from the key assembly and secured therein.

12. A battery lock for a battery having a receptacle with an inner side wall and a back wall for receiving a connector for connecting the battery to an outside component, the receptacle including at least a pair of terminals projecting outwardly from the back wall of the receptacle and a cavity projecting inwardly from the back wall of the receptacle between the terminals, the cavity having at least two opposed transverse protuberances projecting outwardly from an inner side wall of the cavity, comprising:
- a block having an exterior side surface generally conforming to a portion of the inner side wall of the receptacle for seating within the receptacle and preventing external access to one or more of the terminals;
- a locking mechanism secured to the block and projecting outwardly therefrom and extending into the cavity when the block is seated within the receptacle, the locking mechanism movable between at least a first position wherein the locking mechanism can pass by the protuberances permitting the block to be seated in and removed from the receptacle, and a second position wherein the locking mechanism is prevented from passing by the protuberances prohibiting the block from being removed from the receptacle; and,
- a key assembly communicating with the locking mechanism to move the locking mechanism between at least the first and the second positions when a mating key is inserted into the assembly.

13. The battery lock of claim 12 wherein the inner side wall of the receptacle is generally goggle shaped and the exterior side surface of the block is contoured similarly.

14. The battery lock of claim 12 wherein the block has channels therein for receiving the pair of terminals and is composed of an insulated material.

15. The battery lock of claim 12 wherein the block has channels therein for receiving the pair of terminals and is metal, the block further having insulative sleeves within the channels for preventing the block from contacting the terminals.

16. The battery lock of claim 12 wherein the block has a passageway therein for receiving the generally cylindrical key assembly and the locking mechanism.

17. The battery lock of claim 12 wherein the key assembly is connected to the locking mechanism such that rotating the key assembly similarly rotates the locking mechanism.

18. The battery lock of claim 12 wherein the locking mechanism has a channel therein for permitting bayonet mounting, locking, and bayonet unmounting of the lock and the battery.

19. The battery lock of claim 12 wherein the locking mechanism has at least two opposed longitudinal slots formed in an outer surface thereof adapted to accommodate the protuberances as the locking mechanism passes thereby and an annular slot to prevent the locking mechanism to pass by the protuberances.

20. The battery lock of claim 12 wherein the locking mechanism has a longitudinal through adapted to hold an extension projecting from the key assembly therein.

21. The battery lock of claim 20 wherein the extension projecting from the key assembly is secured by an end piece.

22. The battery lock of claim 12 wherein the protruding member is located between the first terminal pin and the second terminal pin of the battery.

23. The battery lock of claim 12 wherein the third cavity is located on the opposite side of the locking system from the protruding member.

24. The battery lock of claim 12 wherein the protruding member has grooves corresponding to members on the walls of the cavity in the battery extending beyond the walls of the cavity in the battery.

25. The battery lock of claim 12 wherein the first cavity and the second cavity include insulating walls.

26. A locking system for locking a disconnected battery, the battery having a pair of terminal pins and a cavity, wherein the cavity is located between the pair of terminal pins, the locking system comprising:
- a battery lock comprising:
    - a first cavity for encasing a first terminal pin of the pair of battery terminal pins;
    - a second cavity for encasing the second terminal pin;
    - a protruding member for residing in the cavity of the battery, wherein the protruding member is located between the first cavity and the second cavity; and,
    - a third cavity for receiving a key; and,
- a key corresponding to the third cavity.

27. The locking system of claim 26 wherein the protruding member is located between the first terminal pin and the second terminal pin of the battery.

28. The locking system of claim 26 wherein the third cavity is located on the opposite side of the locking system from the protruding member.

29. The locking system of claim 26 wherein the protruding member has grooves corresponding to members on the walls of the cavity in the battery extending beyond the walls of the cavity in the battery.

30. The locking system of claim 26 wherein the first cavity and the second cavity include insulating walls.

31. The locking system of claim 26 wherein turning the key in the third cavity causes the protruding member to turn.

* * * * *